United States Patent
Coteus et al.

(10) Patent No.: US 7,640,386 B2
(45) Date of Patent: Dec. 29, 2009

(54) SYSTEMS AND METHODS FOR PROVIDING MEMORY MODULES WITH MULTIPLE HUB DEVICES

(75) Inventors: Paul W. Coteus, Yorktown Heights, NY (US); Warren E. Maule, Cedar Park, TX (US); Edward J. Seminaro, Milton, NY (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/420,046

(22) Filed: May 24, 2006

(65) Prior Publication Data

US 2007/0276977 A1    Nov. 29, 2007

(51) Int. Cl.
*G06F 13/00* (2006.01)
(52) U.S. Cl. .................. 710/316; 710/14; 710/314; 711/5
(58) Field of Classification Search .................. 710/14, 710/316, 312; 711/5
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | 340/172.5 |
| 4,028,675 A | 6/1977 | Frankenberg | 711/106 |
| 4,135,240 A | 1/1979 | Ritchie | |
| 4,150,428 A | 4/1979 | Inrig et al. | |

(Continued)

FOREIGN PATENT DOCUMENTS

EP    0229316 A2    7/1987

(Continued)

OTHER PUBLICATIONS

Boudon, et al., "Novel Bus Reconfiguration Scheme With Spare Lines", IBM Technical Disclosure Bulletin, May 1987, vol. 29, No. 12, pp. 1-3.

(Continued)

*Primary Examiner*—Mark Rinehart
*Assistant Examiner*—Nimesh G Patel
(74) *Attorney, Agent, or Firm*—Cantor Colburn LLP

(57) ABSTRACT

Systems and methods for providing memory modules with multiple hub devices. Exemplary systems include a cascade-interconnect memory system with a memory bus, a memory controller and a memory module. The memory controller is in communication with the memory bus for generating, receiving and responding to memory access requests. The memory module includes a first hub device with three or more ports and a second hub device with three or more ports. A first port on the first hub device is in communication with the memory controller via the memory bus, a second port on the first hub device is in communication with a first set of memory devices, and a third port on the first hub device is cascade connected to a first port on the second hub device. A second port on the second hub device is in communication with a second set of memory devices and a third port on the second hub device supports a cascaded connection to a subsequent hub device in the memory system.

20 Claims, 9 Drawing Sheets

DUAL PORTED QUAD HUB DEVICE DIMM

U.S. PATENT DOCUMENTS

| | | | |
|---|---|---|---|
| 4,472,780 A | 9/1984 | Chenoweth et al. | |
| 4,475,194 A | 10/1984 | LaVallee et al. | 371/10 |
| 4,479,214 A | 10/1984 | Ryan | |
| 4,486,739 A | 12/1984 | Franaszek et al. | 340/347 |
| 4,641,263 A | 2/1987 | Perlman et al. | |
| 4,654,857 A | 3/1987 | Samson et al. | |
| 4,723,120 A | 2/1988 | Petty, Jr. | 340/825.02 |
| 4,740,916 A | 4/1988 | Martin | 364/900 |
| 4,782,487 A | 11/1988 | Smelser | |
| 4,796,231 A | 1/1989 | Pinkham | 365/189.05 |
| 4,803,485 A | 2/1989 | Rypinski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,964,129 A | 10/1990 | Bowden, III et al. | |
| 4,964,130 A | 10/1990 | Bowden, III et al. | |
| 4,985,828 A | 1/1991 | Shimizu et al. | 364/200 |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,049 A | 11/1993 | Takasugi | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,410,545 A | 4/1995 | Porter et al. | |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | |
| 5,522,064 A | 5/1996 | Aldereguia et al. | |
| 5,537,621 A | 7/1996 | Charlot et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,737,589 A | 4/1998 | Doi et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,320 A | 2/1999 | Volkonsky | |
| 5,870,325 A | 2/1999 | Nielsen et al. | 365/63 |
| 5,872,996 A | 2/1999 | Barth et al. | 395/853 |
| 5,881,154 A | 3/1999 | Nohara et al. | |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A * | 12/1999 | Wirt | 711/170 |
| 6,011,732 A | 1/2000 | Harrison et al. | |
| 6,049,476 A | 4/2000 | Laudon et al. | 365/52 |
| 6,076,158 A | 6/2000 | Sites et al. | 712/230 |
| 6,081,868 A | 6/2000 | Brooks | |
| 6,085,276 A | 7/2000 | VanDoren et al. | |
| 6,088,817 A | 7/2000 | Haulin | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,158,040 A | 12/2000 | Ho | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,198,304 B1 * | 3/2001 | Sasaki | 326/39 |
| 6,216,247 B1 | 4/2001 | Creta et al. | |
| 6,219,760 B1 | 4/2001 | McMinn | |
| 6,233,639 B1 | 5/2001 | Dell et al. | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,393,512 B1 | 5/2002 | Chen et al. | |
| 6,393,528 B1 | 5/2002 | Arimilli et al. | 711/137 |
| 6,408,398 B1 * | 6/2002 | Freker et al. | 713/500 |
| 6,425,044 B1 | 7/2002 | Jeddeloh | |
| 6,446,174 B1 * | 9/2002 | Dow | 711/154 |
| 6,446,224 B1 | 9/2002 | Chang et al. | |
| 6,461,013 B1 | 10/2002 | Simon | |
| 6,467,013 B1 * | 10/2002 | Nizar | 711/1 |
| 6,473,836 B1 | 10/2002 | Ikeda | 711/137 |
| 6,477,614 B1 | 11/2002 | Leddige et al. | |
| 6,477,615 B1 | 11/2002 | Tanaka | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | |
| 6,502,161 B1 | 12/2002 | Perego et al. | 711/5 |
| 6,505,305 B1 | 1/2003 | Olarig | |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,526,469 B1 | 2/2003 | Drehmel et al. | |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 * | 7/2003 | Leddige et al. | 711/5 |
| 6,590,827 B2 | 7/2003 | Chang et al. | |
| 6,594,713 B1 | 7/2003 | Fuoco et al. | |
| 6,594,748 B1 | 7/2003 | Lin | |
| 6,601,149 B1 | 7/2003 | Brock et al. | |
| 6,604,180 B2 | 8/2003 | Jeddeloh | |
| 6,611,905 B1 | 8/2003 | Grundon et al. | |
| 6,622,227 B2 | 9/2003 | Zumkehr et al. | |
| 6,631,439 B2 | 10/2003 | Saulsbury et al. | 711/104 |
| 6,636,957 B2 | 10/2003 | Stevens et al. | |
| 6,643,745 B1 | 11/2003 | Palanca et al. | |
| 6,678,811 B2 | 1/2004 | Rentschler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | 711/141 |

| | | |
|---|---|---|
| 6,721,185 B2 | 4/2004 | Dong et al. |
| 6,721,944 B2 | 4/2004 | Chaudhry et al. ............ 717/154 |
| 6,738,836 B1 | 5/2004 | Kessler et al. ................. 710/22 |
| 6,741,096 B2 | 5/2004 | Moss |
| 6,748,518 B1 | 6/2004 | Guthrie et al. |
| 6,754,762 B1 | 6/2004 | Curley |
| 6,766,389 B2 | 7/2004 | Hayter et al. .................. 710/62 |
| 6,775,747 B2 | 8/2004 | Venkatraman ............... 711/137 |
| 6,791,555 B1 | 9/2004 | Radke et al. ................. 345/532 |
| 6,792,495 B1 | 9/2004 | Garney et al. |
| 6,799,241 B2 | 9/2004 | Kahn et al. |
| 6,832,329 B2 | 12/2004 | Ahrens et al. |
| 6,839,393 B1 | 1/2005 | Sidiropoulos ............... 375/371 |
| 6,845,472 B2 | 1/2005 | Walker et al. |
| 6,847,583 B2 | 1/2005 | Janzen et al. |
| 6,851,036 B1 | 2/2005 | Toda et al. |
| 6,877,076 B1 | 4/2005 | Cho et al. .................... 711/157 |
| 6,877,078 B2 | 4/2005 | Fujiwara et al. ............. 711/167 |
| 6,882,082 B2 | 4/2005 | Greeff et al. |
| 6,889,284 B1 | 5/2005 | Nizar et al. .................. 710/315 |
| 6,898,726 B1 | 5/2005 | Lee |
| 6,910,146 B2 | 6/2005 | Dow |
| 6,918,068 B2 | 7/2005 | Vail et al. |
| 6,925,534 B2 | 8/2005 | David |
| 6,944,084 B2 | 9/2005 | Wilcox |
| 6,948,091 B2 | 9/2005 | Bartels et al. |
| 6,949,950 B2 | 9/2005 | Takahashi et al. ............. 326/37 |
| 6,952,761 B2 | 10/2005 | John |
| 6,965,952 B2 | 11/2005 | Echartea et al. |
| 6,977,536 B2 | 12/2005 | Chin-Chieh et al. ......... 327/116 |
| 6,977,979 B1 | 12/2005 | Hartwell et al. |
| 6,978,416 B2 | 12/2005 | Widmer |
| 6,993,612 B2 | 1/2006 | Porterfield |
| 6,996,639 B2 | 2/2006 | Narad |
| 6,996,766 B2 | 2/2006 | Cypher |
| 7,039,755 B1 | 5/2006 | Helms |
| 7,047,370 B1 | 5/2006 | Jeter, Jr. et al. |
| 7,047,371 B2 | 5/2006 | Dortu |
| 7,047,373 B2 | 5/2006 | Kim |
| 7,047,384 B2 | 5/2006 | Bodas et al. |
| 7,076,700 B2 | 7/2006 | Rieger |
| 7,091,890 B1 | 8/2006 | Sasaki et al. |
| 7,103,792 B2 | 9/2006 | Moon |
| 7,120,743 B2 | 10/2006 | Meyer et al. |
| 7,133,790 B2 | 11/2006 | Liou |
| 7,133,972 B2 | 11/2006 | Jeddeloh |
| 7,139,965 B2 | 11/2006 | Shah et al. |
| 7,155,016 B1 | 12/2006 | Betts et al. |
| 7,177,211 B2 | 2/2007 | Zimmerman |
| 7,194,593 B2 | 3/2007 | Schnepper |
| 7,197,594 B2 | 3/2007 | Raz et al. |
| 7,197,670 B2 | 3/2007 | Boatright et al. |
| 7,203,318 B2 | 4/2007 | Collum et al. |
| 7,206,887 B2 | 4/2007 | Jeddeloh |
| 7,206,962 B2 | 4/2007 | Deegan |
| 7,210,059 B2 | 4/2007 | Jeddeloh |
| 7,213,082 B2 | 5/2007 | Jeddeloh |
| 7,216,196 B2 | 5/2007 | Jeddeloh |
| 7,216,276 B1 | 5/2007 | Azimi et al. |
| 7,222,213 B2 | 5/2007 | James |
| 7,227,949 B2 | 6/2007 | Heegard et al. |
| 7,240,145 B2 | 7/2007 | Holman |
| 7,260,685 B2 | 8/2007 | Lee et al. |
| 7,266,634 B2 * | 9/2007 | Ware et al. .................. 711/105 |
| 7,269,765 B1 | 9/2007 | Charlton et al. |
| 7,296,129 B2 | 11/2007 | Gower et al. |
| 7,308,524 B2 | 12/2007 | Grundy et al. |
| 7,313,583 B2 | 12/2007 | Porten et al. |
| 7,319,340 B2 | 1/2008 | Jeddeloh et al. |
| 7,321,979 B2 | 1/2008 | Lee |
| 7,328,381 B2 | 2/2008 | Jeddeloh et al. |
| 7,334,159 B1 | 2/2008 | Callaghan |
| 7,353,316 B2 | 4/2008 | Erdmann |
| 7,363,419 B2 | 4/2008 | Cronin et al. |
| 7,363,436 B1 | 4/2008 | Yeh et al. |
| 7,370,134 B2 | 5/2008 | Jeddeloh |
| 7,376,146 B2 | 5/2008 | Beverly et al. |
| 7,385,993 B2 | 6/2008 | Blanc et al. |
| 7,386,575 B2 | 6/2008 | Bashant et al. |
| 7,386,771 B2 | 6/2008 | Shuma |
| 7,404,118 B1 | 7/2008 | Baguette et al. |
| 7,418,526 B2 | 8/2008 | Jeddeloh |
| 7,421,525 B2 | 9/2008 | Polzin et al. |
| 7,430,145 B2 | 9/2008 | Weiss et al. |
| 7,433,258 B2 | 10/2008 | Rao et al. |
| 2001/0000822 A1 | 5/2001 | Dell et al. .................... 711/170 |
| 2001/0003839 A1 | 6/2001 | Kondo ........................ 711/144 |
| 2001/0029566 A1 | 10/2001 | Shin |
| 2001/0029592 A1 | 10/2001 | Walker et al. |
| 2002/0019926 A1 | 2/2002 | Huppenthal et al. ........... 712/15 |
| 2002/0038405 A1 | 3/2002 | Leddige et al. .............. 711/115 |
| 2002/0059439 A1 | 5/2002 | Arroyo et al. |
| 2002/0083255 A1 | 6/2002 | Greeff et al. ................. 710/305 |
| 2002/0103988 A1 | 8/2002 | Dornier ........................ 712/38 |
| 2002/0112119 A1 | 8/2002 | Halbert et al. ............... 711/115 |
| 2002/0112194 A1 | 8/2002 | Uzelac ........................ 713/500 |
| 2002/0124195 A1 | 9/2002 | Nizar ......................... 713/320 |
| 2002/0124201 A1 | 9/2002 | Edwards et al. |
| 2002/0124202 A1 * | 9/2002 | Doody et al. ................... 714/5 |
| 2002/0147898 A1 | 10/2002 | Rentschler et al. .......... 711/170 |
| 2002/0174274 A1 | 11/2002 | Wu et al. ..................... 710/100 |
| 2003/0009632 A1 | 1/2003 | Arimilli et al. |
| 2003/0028701 A1 | 2/2003 | Rao et al. |
| 2003/0033364 A1 | 2/2003 | Garnett et al. ............... 709/203 |
| 2003/0051055 A1 | 3/2003 | Parrella et al. |
| 2003/0056183 A1 | 3/2003 | Kobayashi |
| 2003/0084309 A1 | 5/2003 | Kohn ........................ 713/189 |
| 2003/0090879 A1 | 5/2003 | Doblar et al. ................ 361/728 |
| 2003/0105938 A1 | 6/2003 | Cooksey et al. |
| 2003/0118044 A1 | 6/2003 | Blanc et al. |
| 2003/0126354 A1 | 7/2003 | Kahn et al. |
| 2003/0126363 A1 | 7/2003 | David |
| 2003/0223303 A1 | 12/2003 | Lamb et al. ............ 365/230.06 |
| 2003/0229770 A1 | 12/2003 | Jeddeloh |
| 2003/0235222 A1 | 12/2003 | Bridges et al. |
| 2003/0236959 A1 | 12/2003 | Johnson et al. ............. 711/167 |
| 2004/0006674 A1 | 1/2004 | Hargis et al. ................. 711/156 |
| 2004/0015650 A1 | 1/2004 | Zumkehr et al. |
| 2004/0049723 A1 | 3/2004 | Obara ........................ 714/729 |
| 2004/0078615 A1 | 4/2004 | Martin et al. |
| 2004/0098546 A1 | 5/2004 | Bashant et al. |
| 2004/0098549 A1 | 5/2004 | Dorst |
| 2004/0117588 A1 | 6/2004 | Arimilli et al. .............. 711/203 |
| 2004/0123222 A1 | 6/2004 | Widmer |
| 2004/0128474 A1 | 7/2004 | Vorbach ...................... 712/10 |
| 2004/0148482 A1 | 7/2004 | Grundy et al. |
| 2004/0160832 A1 | 8/2004 | Janzen et al. |
| 2004/0163028 A1 | 8/2004 | Olarig |
| 2004/0165609 A1 | 8/2004 | Herbst et al. |
| 2004/0199363 A1 | 10/2004 | Bohizic et al. |
| 2004/0205433 A1 | 10/2004 | Gower et al. |
| 2004/0230718 A1 | 11/2004 | Polzin et al. ................... 710/22 |
| 2004/0246767 A1 | 12/2004 | Vogt ........................... 365/154 |
| 2004/0250153 A1 | 12/2004 | Vogt ........................... 713/500 |
| 2004/0260909 A1 | 12/2004 | Lee et al. |
| 2004/0260957 A1 | 12/2004 | Jeddeloh et al. |
| 2005/0022065 A1 | 1/2005 | Dixon et al. |
| 2005/0023560 A1 | 2/2005 | Ahn et al. .................... 257/200 |
| 2005/0027941 A1 | 2/2005 | Wang et al. |
| 2005/0033906 A1 | 2/2005 | Mastronarde et al. |
| 2005/0044305 A1 | 2/2005 | Jakobs et al. |
| 2005/0050237 A1 | 3/2005 | Jeddeloh et al. ............... 710/10 |
| 2005/0050255 A1 | 3/2005 | Jeddeloh ..................... 710/317 |
| 2005/0066136 A1 | 3/2005 | Schnepper .................. 711/154 |
| 2005/0071542 A1 | 3/2005 | Weber et al. |
| 2005/0071707 A1 | 3/2005 | Hampel |

| | | | |
|---|---|---|---|
| 2005/0078506 A1 | 4/2005 | Rao et al. | |
| 2005/0080581 A1 | 4/2005 | Zimmerman et al. | 702/117 |
| 2005/0081085 A1 | 4/2005 | Ellis et al. | |
| 2005/0081114 A1 | 4/2005 | Ackaret et al. | |
| 2005/0081129 A1 | 4/2005 | Shah et al. | |
| 2005/0086424 A1 | 4/2005 | Oh et al. | |
| 2005/0086441 A1 | 4/2005 | Myer et al. | |
| 2005/0257005 A1 | 4/2005 | Dell et al. | |
| 2005/0097249 A1 | 5/2005 | Oberlin et al. | |
| 2005/0105350 A1 | 5/2005 | Zimmerman et al. | |
| 2005/0120157 A1 | 6/2005 | Chen et al. | 710/313 |
| 2005/0125702 A1 | 6/2005 | Huang et al. | |
| 2005/0125703 A1 | 6/2005 | Lefurgy et al. | |
| 2005/0138246 A1 | 6/2005 | Chen et al. | |
| 2005/0138267 A1 | 6/2005 | Bains et al. | |
| 2005/0144399 A1 | 6/2005 | Hosomi | 711/145 |
| 2005/0149665 A1 | 7/2005 | Wolrich et al. | |
| 2005/0166006 A1 | 7/2005 | Talbot et al. | |
| 2005/0177677 A1 | 8/2005 | Jeddeloh | |
| 2005/0177690 A1 | 8/2005 | LaBerge | 711/154 |
| 2005/0204216 A1 | 9/2005 | Daily et al. | 714/724 |
| 2005/0216678 A1 | 9/2005 | Jeddeloh | |
| 2005/0220097 A1 | 10/2005 | Swami et al. | |
| 2005/0223196 A1 | 10/2005 | Knowles | |
| 2005/0229132 A1 | 10/2005 | Butt et al. | 716/10 |
| 2005/0248997 A1 | 11/2005 | Lee | |
| 2005/0259496 A1 | 11/2005 | Hsu et al. | 365/226 |
| 2005/0289292 A1 | 12/2005 | Morrow et al. | |
| 2005/0289377 A1 | 12/2005 | Luong | |
| 2006/0004953 A1 | 1/2006 | Vogt | |
| 2006/0010339 A1 | 1/2006 | Klein | |
| 2006/0036826 A1 | 2/2006 | Dell et al. | |
| 2006/0036827 A1 | 2/2006 | Dell et al. | |
| 2006/0080584 A1 | 4/2006 | Hartnett et al. | |
| 2006/0085602 A1 | 4/2006 | Huggahalli et al. | |
| 2006/0095592 A1* | 5/2006 | Borkenhagen | 710/2 |
| 2006/0095679 A1 | 5/2006 | Edirisooriya | |
| 2006/0104371 A1 | 5/2006 | Schuermans et al. | |
| 2006/0107175 A1 | 5/2006 | Dell et al. | |
| 2006/0112238 A1 | 5/2006 | Jamil et al. | |
| 2006/0161733 A1 | 7/2006 | Beckett et al. | |
| 2006/0162882 A1 | 7/2006 | Ohara et al. | |
| 2006/0168407 A1 | 7/2006 | Stern | |
| 2006/0179208 A1 | 8/2006 | Jeddeloh | |
| 2006/0190674 A1 | 8/2006 | Poechmueller | |
| 2006/0195631 A1 | 8/2006 | Rajamani | |
| 2006/0206742 A1 | 9/2006 | James | |
| 2006/0212666 A1 | 9/2006 | Jeddeloh | |
| 2006/0224764 A1 | 10/2006 | Shinohara et al. | |
| 2006/0277365 A1 | 12/2006 | Pong | |
| 2006/0288172 A1 | 12/2006 | Lee et al. | |
| 2007/0005922 A1 | 1/2007 | Swaminathan et al. | |
| 2007/0025304 A1 | 2/2007 | Leelahakriengkrai et al. | |
| 2007/0038907 A1 | 2/2007 | Jeddeloh et al. | |
| 2007/0067382 A1 | 3/2007 | Sun | |
| 2007/0083701 A1 | 4/2007 | Kapil | |
| 2007/0160053 A1* | 7/2007 | Coteus et al. | 370/394 |
| 2008/0043808 A1 | 2/2008 | Hsu et al. | |
| 2008/0162807 A1 | 7/2008 | Rothman et al. | |
| 2008/0163014 A1 | 7/2008 | Crawford et al. | |
| 2008/0222379 A1 | 9/2008 | Jeddeloh | |
| 2009/0006900 A1 | 1/2009 | Lastras-Montano et al. | |

FOREIGN PATENT DOCUMENTS

| | | |
|---|---|---|
| EP | 0470734 A1 | 2/1992 |
| EP | 0899743 A2 | 6/1998 |
| EP | 1429340 A2 | 6/2004 |
| GB | 2396711 A | 6/2004 |
| JP | 59153353 A | 9/1984 |
| JP | 0114140 A | 6/1989 |
| JP | 0432614 | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9621188 A1 | 7/1996 |
| WO | 9812651 | 3/1998 |
| WO | 0004481 A2 | 1/2000 |
| WO | 0223353 A2 | 3/2002 |
| WO | WO2005038660 | 4/2005 |
| WO | 2007109888 | 10/2007 |

OTHER PUBLICATIONS

NB940259 (IBM Technical Disclosure Bulletin, Feb. 1994; vol. 37; pp. 59-64).

Wikipedia, Serial Communications, [online], [retrieved Apr. 10, 2007 from the Internet], http://en.wikipedia.org/wiki/Serial_communications, 3 pages.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommuications", Second Edition, John Wiley & Sons, Inc. 1987. 3 pgs.

PCT International Search Report PCT/EP2006/068984. Mailed Feb. 16, 2007.

PCT International Search Report PCT/EP2007/057916. Mailed Dec. 14, 2007.

International Search Report, International Application No. PCT/EP2007/054929, International Publication No. WO 2007/135144 A1, received Mar. 21, 2008.

PCT Search Report. PCT/EP2007/057915. Mailed Nov. 7, 2007.

Yang, Q.; Bhuyan, L.N., "Analysis of packet-switched multiple-bus multiprocessor systems," Computers, IEEE Transactions on, vol. 40, No. 3, pp. 352-357, Mar. 1991.

Li, P; Martinez, J.; Tang, J.; Priore, S..; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.

IBM. IBM WebSphere Enterprise Service Bus. Version 6.0.2 2006 (165-0071-USC NOA 06-12-09).

BEA Systems Inc. Integration of Clustered BEA AquaLogic Service Bus Domain and Remote Tibco Enterprise Message Service 4.2.0 for Messaging Application in SOA. BEA White Paper. 2006 (165-0071-USC NOA 06-12-09).

Oracle. Oracle Enterprise Service Bus. Oracle Data Sheet. Oct. 2006 (165-0071-USC NOA 06-12-09).

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

Jungjoon Kim et al.; "Performance and Architecture Features of Segmented Multiple Bus System;" IEEE Computer Society; 1999 International Conference on Parallel Processing (ICPP '99).

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

Seceleanu et al.; "Segment Arbiter as Action System;" IEEE 2003 pp. 249-252.

Understanding System Memory and CPU Speeds: A Layman's Guide to the Front Side Bus (FSB), [online]; [retrieved on Feb. 23, 2006]; retrieved from the Internet http://www.directron.com/fsbguide.html.

JEDEC Solid State Technology Association, "JEDEC Standard: DDR2 SDRAM Specification", Jan. 2004, JEDEC, Revision JESD79-2A, p. 10.

Brown, et al "Compiler-Based I/O Prefetching for Out-of-Core Applications", ACM Transactions on Computer Systems, vol. 19, No. 2, May 2001, pp. 111-170.

Wang, et al., "Guided Region Prefetching: A Cooperative Hardware/Software Approach", pp. 388-398.

Natarajan, et al., "A Study of Performance Impact of Memory Controller Features in Multi-Processor Server Environment", pp. 80-87, 2004.

Nilsen, "High-Level Dynamic Memory Management for Object-Oriented Real-Time Systems", pp. 86-93.

Massoud Pedram, "Power Minimization in IC Design Principles and Applications", ACM Transactions on Design Automation of Electronic Systems vol. 1, No. 1, Jan. 1996, pp. 3-56.

P.R. Panda, "Data and Memory Optimization Techniques For Embedded Systems", ACM Transactions on Design Automation of Electronic Systems, vol. 6, No. 2, Apr. 2001, pp. 149-206.

Luca Benini, et al., "System-Level Powers Optimization: Techniques and Tools", ACM Transactions on Design Automation of Electronic Systems, vol. 5, No. 2, Apr. 2000, pp. 115-192.

Fully Buffered DIMM (FB-DIMM), XP002490174, Joe Jeddeloh, Advanced Systems Technology, Micron Technology, Inc. Apr. 16, 2008, 23 pages.

"Novel Bus Reconfiguration Scheme With Spare Lines", XP000676205, IBM Technical Disclosure Bulletin, vol. 29, No. 12, IBM Copr., NY, US, May 1, 1987, pp. 5590-5593.

"Using Dual and Mappable Spare Bus", XP000433763, IBM Technical Disclosure Bulletin, vol. 37, No. 2B, IBM Copr., NY, US, Feb. 1, 1994, pp. 59-63.

"The RAS Implications of DIMM Connector Failure Rates in Large, Highly Available Server Systems", Timothy J. Dell Ed.—Anonymous, The 53rd IEEE Holm Conference on Electrical Contacts, IEEE, PI, Sep. 1, 2007, pp. 256-261.

European Search Report, European Patent Application 05106700.7, received Aug. 11, 2008.

European Search Report, European Patent Application No. 05106701.5, mailed Oct. 7, 2008, 5 pages.

European Search Report, European Patent Application No. 05109837.4, mailed Oct. 7, 2008, 5 pages.

Joe Jeddeloh, Fully Buffered DIMM (FB-DIMM), XP002490174, Advanced Systems Technology, Micron Technology, Inc. Apr. 16, 2008, 32 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

* cited by examiner

CASCADED DUAL HUB DEVICE DIMM

CASCADED QUAD HUB DEVICE DIMM

DUAL PORTED QUAD HUB DEVICE DIMM

MULTI DUAL PORTED HUB DEVICE DIMMs

TWIN DUAL PORTED HUB DEVICE DIMM

SYSTEMS AND METHODS FOR PROVIDING MEMORY MODULES WITH MULTIPLE HUB DEVICES

GOVERNMENT RIGHTS

This invention was made with Government support under Agreement No. NBCH30390004 awarded by DARPA. The Government has certain rights in the invention.

BACKGROUND OF THE INVENTION

This invention relates generally to computer memory, and more particularly to systems and methods for providing memory modules with multiple hub devices.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-before-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 20 that is directly (i.e. point-to-point) connected to a memory controller 14 via a bus 40, and which further includes logic circuitry 24 (such as an application specific integrated circuit, or "ASIC") that buffers, registers or otherwise acts on the address, data and control information that is received from the memory controller 14. The memory module 20 can be programmed to operate in a plurality of selectable or programmable modes by way of an independent bus, such as an inter-integrated circuit (I2C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. No. 5,513,135, U.S. Pat. No. 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 210 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

FIG. 5 illustrates a computing system comprised of a processor chip 500 with an integrated memory controller 510 and a cache 512; and one or more memory subsystems 503 (also referred to as memory modules) that include one or more memory hub devices 504 each connected to one or more memory devices 509. Each memory subsystem 503 is associated with a memory channel that is connected to the integrated processor chip 500 through a cascade interconnect bus structure (also referred to as a hub-and-spoke topology). The memory controller(s) 510 are interconnected to memory hub devices 504 via one or more physical high speed bus(es) 506. Each hub device 504 provides one or more low speed independent connection(s) to groups of memory devices 509 following, for example, the fully buffered DIMM standard. Multiple (typically 2 or 4) identically configured physical networks 508 of memory modules are logically grouped together into module groups 501 and 502, and operated on in unison by the memory controller 510 to provide for optimal latency, bandwidth, and error correction effectiveness for system memory cache line transfer (typically 64 B or 128 B). However, a commonly assigned U.S. patent application, 11/464,503, entitled SYSTEMS AND METHODS FOR PROGRAM DIRECTED MEMORY ACCESS PATTERNS, filed on Aug. 15, 2006, provides the means to have logical networks of hubs dynamically associated and de-associated for specific addresses based on software hints.

The memory controller 510 translates system requests for memory access into packets according to a memory hub communication protocol. Typically, memory write packets contain at least a command, address, and associated data. Memory read packets typically contain at least a command and address, and imply that an expected packet will be returned which contains the requested data.

FIG. 6 depicts a block diagram of a memory hub device 504 including a link interface 604 for providing the means to re-synchronize, translate and re-drive high speed memory access information to associated DRAM devices 509 and/or to re-drive the information downstream on the memory bus 506 as applicable based on the memory system protocol. The information is received by the link interface 604 from an upstream memory hub device 504 or from a memory controller 510 via the memory bus 506. The memory device data interface 615 manages the technology-specific data interface with the memory devices 509 and controls the bi-directional memory device data bus 608. The memory hub control 613 responds to access request packets by responsively driving the memory device 509 technology-specific address and control bus 614 and directing the read data flow selector 607 and the write data flow selector 610. The link interface 604 decodes the packets and directs the address and command information directed to the local hub device 504 to the memory hub control 613. Memory write data from the link interface 604 can be temporarily stored in the write data queue 611 or directly driven to the memory devices 509 via the write data flow selector 610 and internal bus 612, and then sent via internal bus 609 and memory device data interface 615 to memory device data bus 608. Memory read data from memory device(s) 509 can be queued in the read data queue 606 or directly transferred to the link interface 604 via internal bus 605 and read data selector 607, to be transmitted upstream on the bus 506 to a memory controller in the integrated processor chip 500 as a read reply packet.

Each hub device 504 in turn adds data to or receives data from the channel (which includes the memory bus 506). The memory access latency of a memory hub-based structure, comprised of cascade interconnected hub devices 504 together with point-to-point electrical or optical connections is degraded by having to propagate through each hub device 504 in the chain, with hub devices 504 located on each memory subsystem 503 (also referred to herein as memory modules). In addition, power consumption generally increases as the spacing increases between memory hub devices 504 (and the associated memory modules).

To support the cascade interconnection of memory hub devices 504, each memory module with a hub device 504 attaches to the memory bus 506 (including both an upstream bus and a downstream bus) which connects to the memory module, or memory subsystem 503. In the case of a single memory module connected to a memory controller 510, the downstream bus is idle. Idled busses are a waste of communication resource, but in this case they are required to allow another memory module to be added in the future.

A need exists for having a memory hub device network and topology with lower memory access latency and lower memory hub device power. Moreover, it would be desirable to have a higher memory hub device bandwidth to memory devices 509 on a single memory module, with a module interface footprint not exceeding that of a conventional memory module. For those systems with only one memory module per memory controller interface, it would be desirable to have no idled busses and/or bus interfaces.

BRIEF SUMMARY OF THE INVENTION

Embodiments include systems and methods for providing memory modules with multiple hub devices. Exemplary systems include a cascade-interconnect memory system with a memory bus, a memory controller and a memory module. The memory controller is in communication with the memory bus for generating, receiving and responding to memory access requests. The memory module includes a first hub device with three or more ports and a second hub device with three or more ports. A first port on the first hub device is in communication with the memory controller via the memory bus, a second port on the first hub device is in communication with a first set of memory devices, and a third port on the first hub device is cascade connected to a first port on the second hub device. A second port on the second hub device is in communication with a second set of memory devices and a third port on the second hub device supports a cascaded connection to a subsequent hub device in the memory system.

Additional embodiments include a cascade-interconnect memory system with two or more memory busses including a first memory bus and a second memory bus, a memory controller and a memory module. The memory controller is in communication with the memory busses for generating, receiving and responding to memory access requests. The memory includes a first hub device with three or more ports and a second hub device with three or more ports. A first port on the first hub device is in communication with the memory controller via the first memory bus, a second port on the first hub device is in communication with a first set of memory devices, and a third port on the first hub device is cascade connected to a first port on the second hub device. A second port on the second hub device is in communication with a second set of memory devices and a third port on the second hub device is in communication with one of a subsequent hub device in the memory system and the memory controller via the second memory bus.

Additional embodiments include a memory module including a first hub device, a second hub device and a programmable operating mode selector. The first hub device includes a first port for communicating with a memory controller via a first memory bus, a second port in communication with a first set of memory devices, and a third port that supports a cascaded connection to an other hub device. The second hub device includes a first port for communicating with the memory controller via a second memory bus, a second port in communication with a second set of memory devices, and a third port that supports a cascaded connection to an other hub device. The programmable operating mode selector is utilized for selecting between a first mode of operation which causes the third port on the first hub device to be in communication with the third port on the second hub device, and a second mode of operation which causes the third port on the first hub device and the third port on the second hub device to be idle, thereby allowing the memory module to operate as a single memory module or two distinct memory modules.

Further embodiments include a memory module including a first hub device and a second hub device. The first hub device includes a first port in communication with a memory controller via a memory bus, a second port in communication with a first set of memory devices, and a third port. The second hub device includes a first port in communication with the third port on the first hub device via a cascade connection, a second port in communication with a second set of memory devices, and a third port for supporting a cascade connection to a subsequent hub device or to the memory controller.

Further embodiments include a method for selecting a memory module operating mode. The method includes receiving an operating mode selection at a memory module, the memory module including a first hub device in communication with a memory controller and a second hub device. If the operating mode selection indicates cascade interconnect, then the first hub device is automatically cascade connected to the second hub device. If the operating mode selection indicates dual ported module, then the second hub device is automatically connected to the memory controller.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments relate to memory systems with one or more memory controllers, memory hub devices and memory modules. In exemplary embodiments, the memory modules (e.g., DIMMs) contain multiple hub devices and the hub devices include one or more ports to communicate with the memory devices that they control. The multiple hub devices in the memory system share a high speed memory bus to a memory controller in a cascaded fashion. In alternate exemplary embodiments, the multiple hub devices interface with two or more high speed memory busses to the memory controller but without the ability to be cascaded. Exemplary embodiments provide the ability to have higher bus utilization, higher bus bandwidth, lower memory access latency and lower memory hub device power on a memory system having one or more memory modules (e.g., memory DIMMs), all with a memory module interface footprint (e.g., pincount) that may match that of a conventional memory module.

Figure 5:
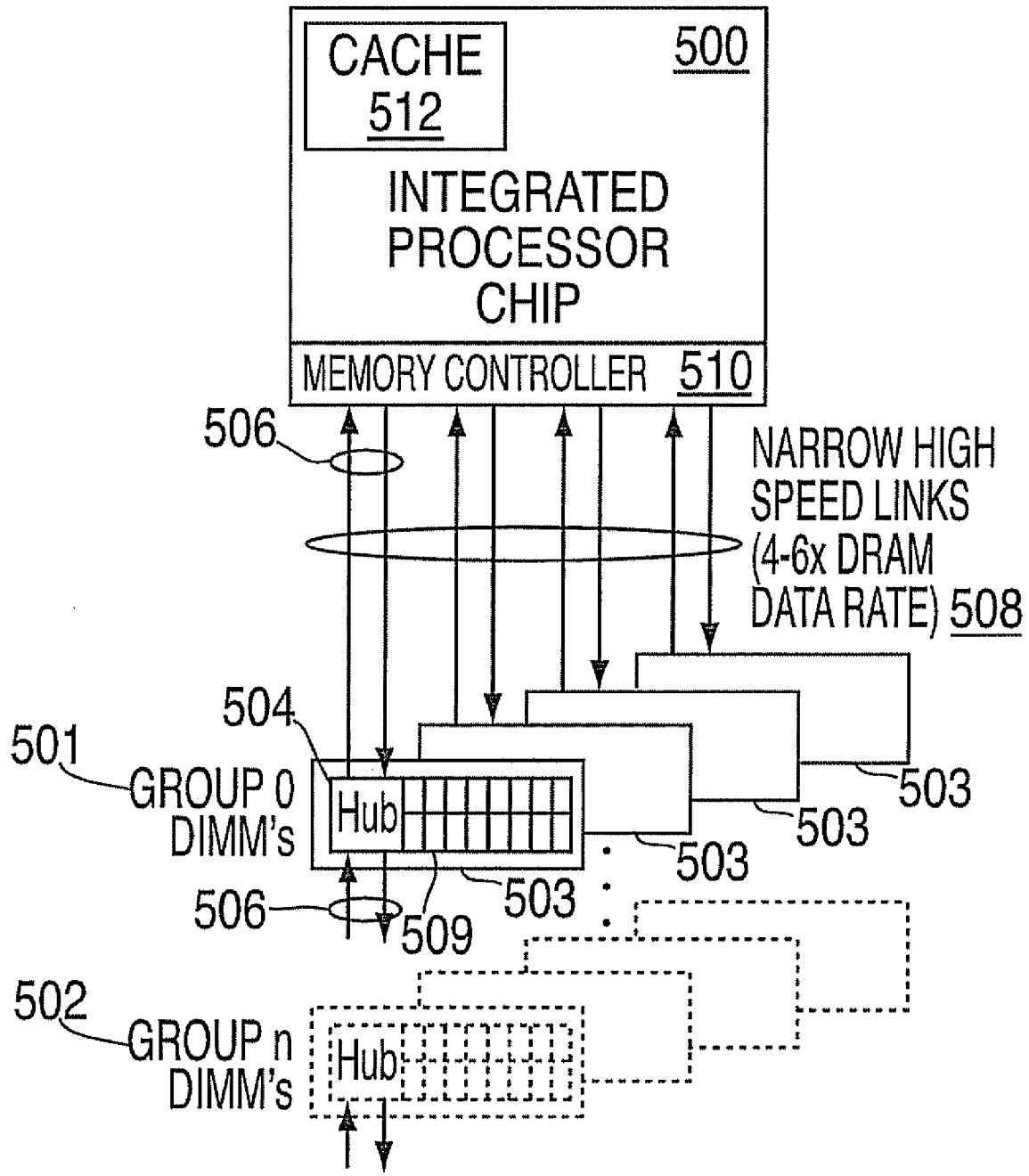
FIG. 5 depicts a block diagram of a computer memory system which includes multiple independent cascade interconnect memory interface busses that operate in unison to support a single data access request.
Figure 7:
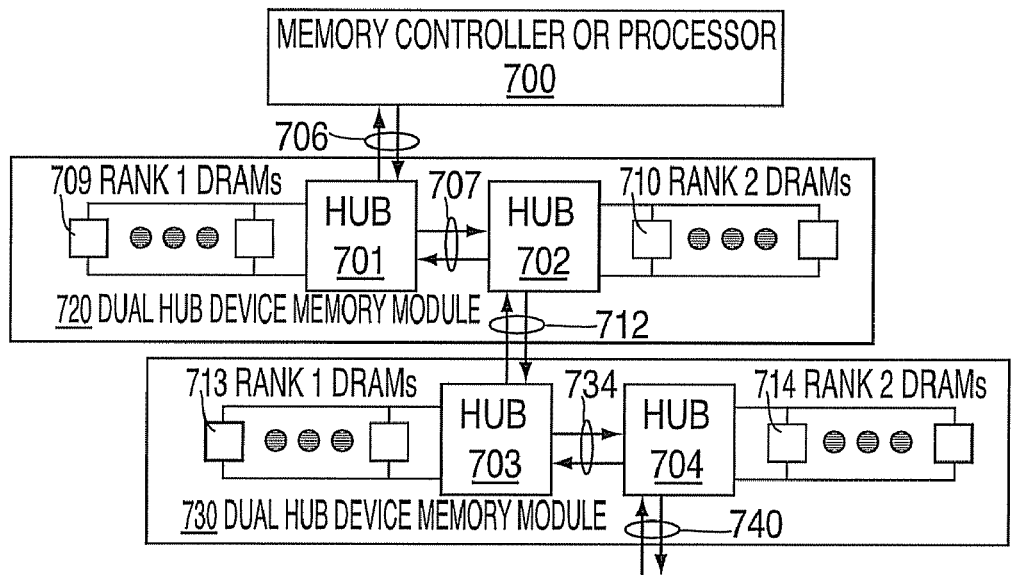
FIG. 7 is a block diagram of a memory system with a cascaded dual hub device memory module that may be implemented by exemplary embodiments.

FIG. 7 is a block diagram of a memory system with a cascaded dual hub device memory module that may be implemented by exemplary embodiments. The memory module 720 in FIG. 7 has two hub devices 701 and 702. Compared to the memory system depicted in FIG. 5, FIG. 7 depicts a memory system that has combined the functions of two memory modules, associated with a single memory channel, into a single memory module. Each hub device 701 and 702 connects to an associated set of DRAM devices 709 and 710 respectively, in a manner similar to that done in FIG. 5. As with FIG. 5, one or more physical banks, or sets, of DRAM devices 709 are connected to each hub device 701 and 702 in FIG. 7, and there can be one or more memory device busses in communication with the DRAM devices 709. A key advantage of exemplary embodiments, such as the memory system depicted in FIG. 7, is that in the footprint of one memory module (e.g., memory module 720) it is possible to achieve the bandwidth obtainable from two hub devices (e.g., hub device 701 and 702), each accessing unique memory devices (e.g., DRAM devices 709 from hub device 701 and DRAM devices 710 from hub device 702) but interfacing to the same memory controller 700 (which may be integrated into a processor).

As depicted in FIG. 7, the hub devices (701 702 703 704) are connected to the memory controller 700 by a memory bus similar to the memory bus 506 described in reference to FIG. 5. In FIG. 7, each portion of the memory bus is given a different number (706 707 712 734 740) for explanatory purposes. It should be noted that these numbers are collectively referred to as the memory bus and together are utilized for providing communication in a manner similar to that described herein with respect to memory bus 506.

As depicted in FIG. 7, hub device 701 is connected to the memory controller 700 via memory bus 706. An inter-module connecting memory bus 707 is utilized to connect hub device 701 and hub device 702. Memory bus 712 connects hub device 702 to hub device 703 which is located on memory module 730 (shown as a dual hub memory module but could be any compatible hub-based cascade-interconnected memory module). Additional memory modules can be cascade interconnected via the memory bus up to the limits of the memory structure. Dual hub and single hub memory modules can be mixed on a memory channel.

Referring to the memory system depicted in FIG. 7, memory module 720 has two ranks (or sets) of memory devices 709 and 710 connected to hub devices 701 and 702 respectively. In exemplary embodiments, the memory controller 700 views the configuration depicted in FIG. 7 as four memory modules (i.e., each hub device is separately addressable), even though the physical implementation includes only two memory modules. In effect, the configuration depicted in FIG. 7 provides access to the same amount of memory devices as four memory modules but uses only two carriers each containing two hub devices. In addition, the length of the memory bus connection required between hub device 701 and hub device 702 (and between hub devices 703 and 704) is minimized because they are on the same physical memory module. Further, in exemplary embodiments, because they reside on the same memory module 720 (i.e., are on the same card assembly), hub device 701 and hub device 702 may share common circuitry such as common clocks, a single EEPROM (e.g. for Serial Presence Detect information), a common I2C or related initialization and/or error logic/bus, etc. If produced on the same die or substrate, these devices may further share circuitry such as PLLs, DLLs, voltage regulators, registers, initialization logic, error reporting circuitry, diagnostic logic and/or other circuitry used in common by both hubs.

The hub devices depicted in FIG. 7 include three ports or interfaces. For example, hub device 701 includes a first port to connect the hub device 701 to the memory bus 706 for receiving information such as address, command and data from the memory controller 700 (or from an upstream hub device), as well as to redrive data and/or error, status and other operational information intended for the memory controller 700 (or an upstream hub device). A second port on the hub device is utilized to connect the hub device 701 to the memory device bus for communicating with the memory devices 709. A third port on the hub device 701 is utilized to connect to the memory bus 707 to re-drive information such as address, command and data to one or more hub devices located downstream from the hub device, as well as to receive and re-drive data and/or error, status and other operational information if it is intended for the memory controller 700 (or an upstream hub device). Additional ports or interfaces may also exist on the hub(s) for connection to one or more additional banks of memory devices, an SPD device, a status bus, error reporting bus, a diagnostic bus, etc. These ports may further share a common set of connections to the memory controller and/or other hub devices, as a means of minimizing total pincount on the receiving device (memory controller, service processor, etc).

Figure 6:
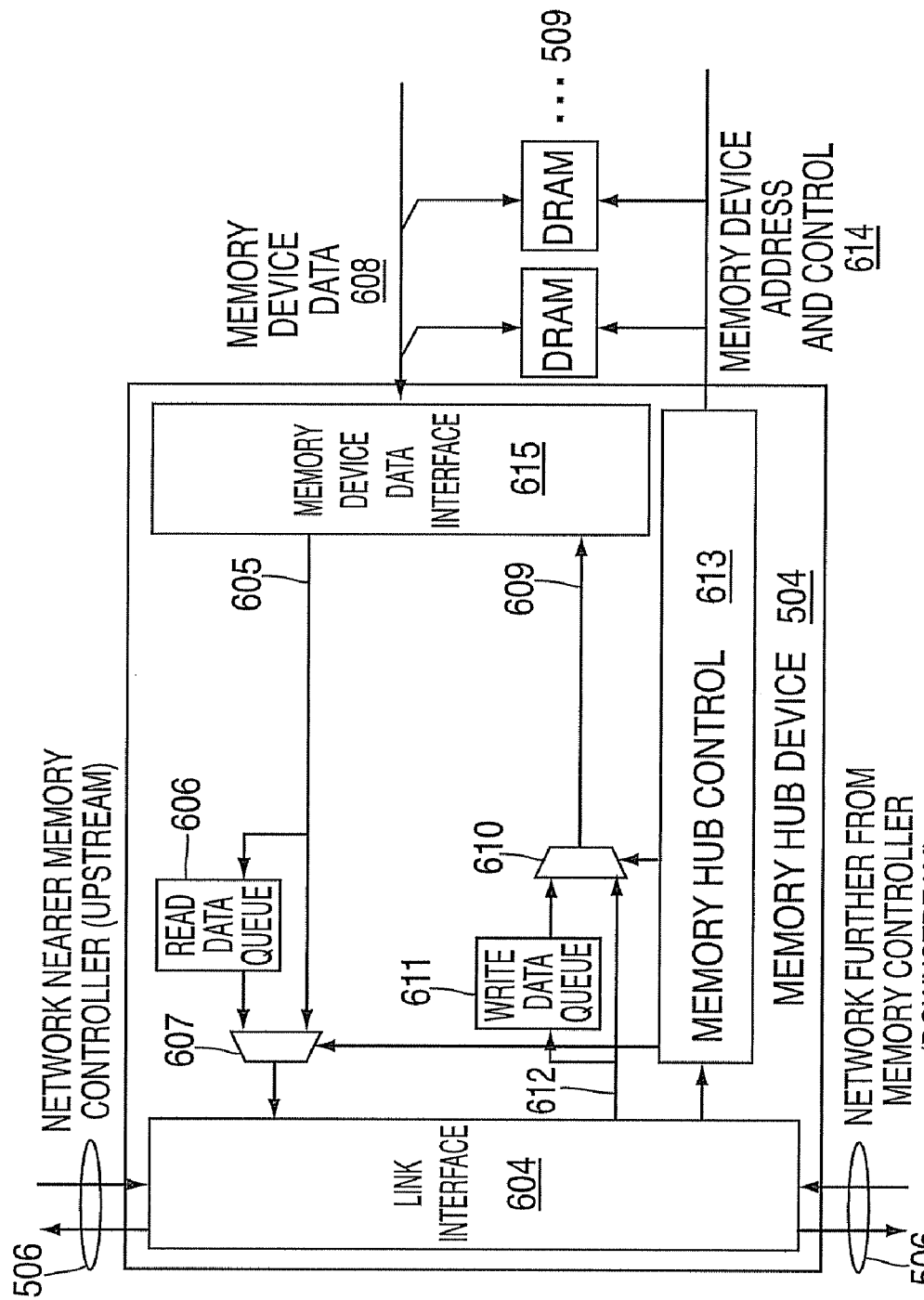
FIG. 6 depicts a memory hub device.
Figure 8:
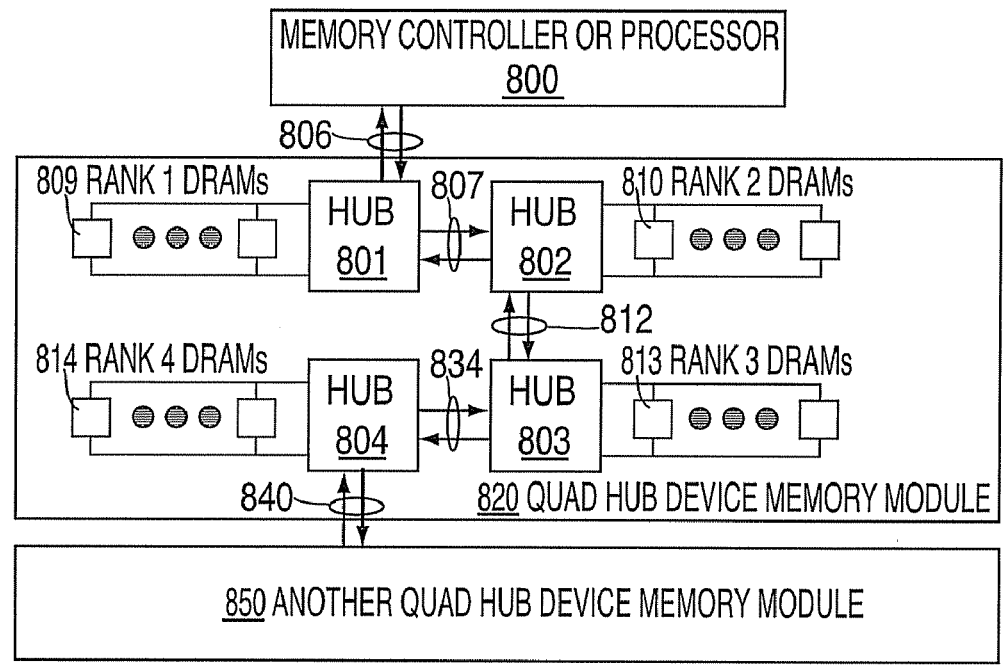
FIG. 8 is a block diagram of a memory system with a cascaded quad hub device memory module that may be implemented by exemplary embodiments.

FIG. 8 is a block diagram of a memory system with a cascaded quad hub device memory module that may be implemented by exemplary embodiments. FIG. 8 is similar to FIG. 7, but it includes four hub devices (801, 802, 803, 804) each connected to one or more DRAM devices (809, 810, 813, 814 respectively). The hub devices and associated memory devices depicted in FIG. 8 are packaged on a single memory module 820, although the function can be assembled onto other substrates, cards and/or boards. The memory module 820 is connected to a memory controller 800 (which may be integrated into a processor or other control element) and can be cascade connected with other memory modules 850. Although described as quad hub device memory modules, memory module positions 820 and 850 can also be constructed as dual hub device memory modules (such as those shown in FIG. 7), single hub device memory modules (as shown in FIGS. 5 and 6) and/or other memory module configurations having a compatible interface, protocol, etc. Thus, a single, double and/or quad memory module may be intermixed and located in any position in the memory system.

As depicted in FIG. 8, the hub devices (801 802 803 804) are connected to the memory controller 800 by a memory bus similar to the memory bus 506 described in reference to FIG. 5. In FIG. 8, each portion of the memory bus is given a different number (806 807 812 834 840) for explanatory purposes. It should be noted that these numbers are collectively referred to as the memory bus and together are utilized for providing communication in a manner similar to that described herein with respect to memory bus 506.

In exemplary embodiments, the memory module 820 depicted in FIG. 8 would have an increased height to accommodate the additional components, and would be, for example, approximately twice the height of a conventional fully buffered DIMM. In exemplary embodiments, in the case of a double high DIMM, hub devices 801 and 804 would be preferentially located near the bottom edge, since one of their two processor busses 806 and 840 are connected to the card edge connector. As described in the text associated with FIG. 7, additional busses may exist between the hub devices and the card edge connector, for the purpose(s) described.

Figure 9:
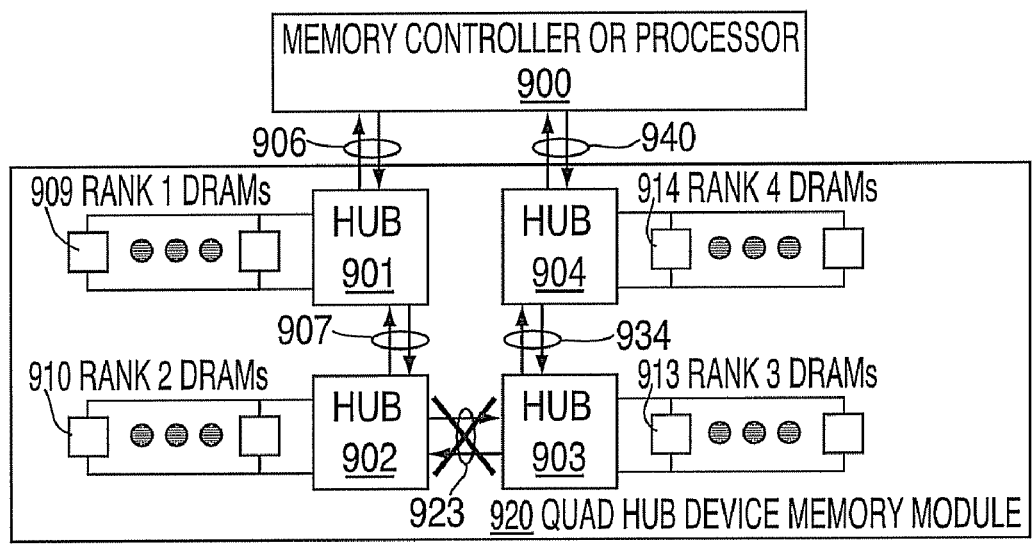
FIG. 9 is a block diagram of a memory system with a dual ported quad hub device memory module that may be implemented by exemplary embodiments.

FIG. 9 is a block diagram of a memory system with a cascaded dual ported quad hub device memory module that may be implemented by exemplary embodiments. FIG. 9 depicts a "double high" quad hub device memory module 920, having two separate high speed memory busses 906 and 940 connected to the memory controller 900 (that may be integrated into a processor). As depicted in FIG. 9, the hub devices (901 902 903 904) are connected to the memory controller 900 by two memory busses that are both similar to the memory bus 506 described in reference to FIG. 5. In FIG. 9, one memory bus includes 906, and 907 and the other memory bus includes 940 and 934. It should be noted that both of these sets of numbers are collectively referred to as the memory bus and together are utilized for providing communication in a manner similar to that described herein with respect to memory bus 506. In the exemplary embodiment, when the busses 906 and 940 are operational, the communication interface bus 923 is disabled and there is no conventional high speed communication interface bus 923 between hub device 902 and hub device 903, as indicated by the "X" between hub device 902 and hub device 903.

An interface for providing status about components of the memory module 920 (including the hub devices and busses) or other form of communication link may exist between hub devices 901, 902, 903 and/or 904, however, primarily for the purposes of communicating status of other operational information between the hub devices resident on the memory module 920. Also, referring back to FIG. 8, memory bus 840 may be utilized as another communication bus back to the memory controller 800. In exemplary embodiments, the system depicted in FIG. 9 is implemented by a specialized memory module that is produced with the same fundamental components as FIG. 8, but having different device interconnections. In alternate exemplary embodiments, each hub device may be designed such that it can be operated in two modes: the conventional mode; and a mode where the two high speed bus ports perform different functions. As is evident to those skilled in the art, the functions of memory module 820 in FIG. 8, and memory module 920 in FIG. 9 can be realized with the same physical hardware. In exemplary embodiments, hub devices 801 and 802 operate consistent with hub devices 901 and 902, while hub devices 903 and 904 operate in a different manner than hub devices 803 and 804. As demonstrated in FIG. 8, hub devices 801 and 802 connect to memory controller 700 via memory bus 806, using a cascade interconnect structure, and hub devices 901 and 902 connect to memory controller 900 in a like manner in FIG. 9. These hub devices and the associated memory devices could then be accessed by a memory controller in a consistent manner, offering similar performance characteristics. As hub devices 803 and 804 in FIG. 8 are cascade connected to the same memory bus 806 as hub devices 801 and 802, these hub devices and associated memory will add increased memory density and bandwidth to the single memory channel shown, whereas hub devices 903 and 904 of FIG. 9 can be operated such that they provide additional memory density and bandwidth to a single memory channel, or be configured to operate as a separate memory channel—when connected to the memory controller 900 using bus 940, with bus 923 not used as a memory bus.

The control associated with selecting the operating mode in which to operate the memory modules and hub devices can be set in a variety of ways. In exemplary embodiments, the operating mode of the memory module and associated hub devices is set via a contact on the card edge. If, for example, the contact is grounded, then the function associated with the memory module 820 in FIG. 8 is realized. If the contact is raised in voltage above a defined threshold, then the function associated with the memory module 920 in FIG. 9 is realized, and the memory module 920 is not cascaded. In other exemplary embodiments, the operating mode of the memory module and associated hub devices is programmable, or dynamically selectable (e.g., via a mode register in the hub device, or alternatively in an associated programmable device such as an EEPROM).

Thus, the memory system in FIG. 9 can be operated and/or utilized in at least three different manners depending on the mode(s) that is selected. In a first mode, the path for data access includes: the memory controller 900 to memory bus 906 to hub device 901 to memory bus 907 to hub device 902 and back (i.e., hub device 902 to memory bus 907 to hub device 901 to memory bus 906 to the memory controller 900) and the memory controller 900 to memory bus 940 to hub device 904 to memory bus 934 to hub device 903 and back (i.e., hub device 903 to memory bus 934 to hub device 904 to memory bus 940 to the memory controller 900). In a second mode, the path for data access includes: the memory controller 900 to memory bus 906 to hub device 901 to memory bus 907 to hub device 902 to memory bus 923 to hub device 903 to memory bus 934 to hub device 904 and back (i.e., hub device 904 to memory bus 934 to hub device 903 to memory bus 923 to hub device 902 to memory bus 907 to hub device 901 to memory bus 906 to the memory controller 900). In a third mode, the path for data access includes: the memory controller 900 to memory bus 940 to hub device 904 to memory bus 934 to hub device 903 to memory bus 923 to hub device 902 to memory bus 907 to hub device 901 and back (i.e., hub device 901 to memory bus 907 to hub device 902 to memory bus 923 to hub device 903 to memory bus 934 to hub device 904 to memory bus 940 to the memory controller 900). In exemplary embodiments, the second mode is utilized as a back-up mode to the first and/or third modes when memory bus 940 is not operational and the third mode is a back-up mode to the first and/or second modes when memory bus 906 is not operational.

It should be evident to those skilled in the art that the dual hub device memory modules 720 and 730 of FIG. 7 can also have a second mode for hub device 702, where with the aforementioned card edge contact raised above a threshold (or via a programmable or dynamically selected manner), the high speed module-to-module cascade memory bus 712 of FIG. 7 can be instead connected to the memory controller 700 with all of the appropriate communication formatting enabled. In this case memory bus 707 would generally be idle and powered off.

Figure 10:
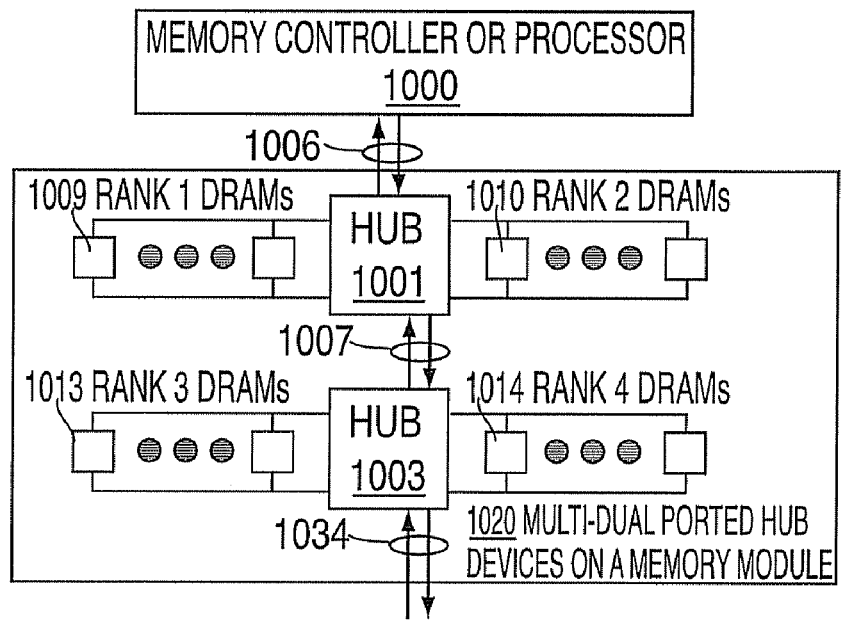
FIG. 10 is a block diagram of a memory system with a multiple dual ported hub device memory module that may be implemented by exemplary embodiments.
Figure 11:
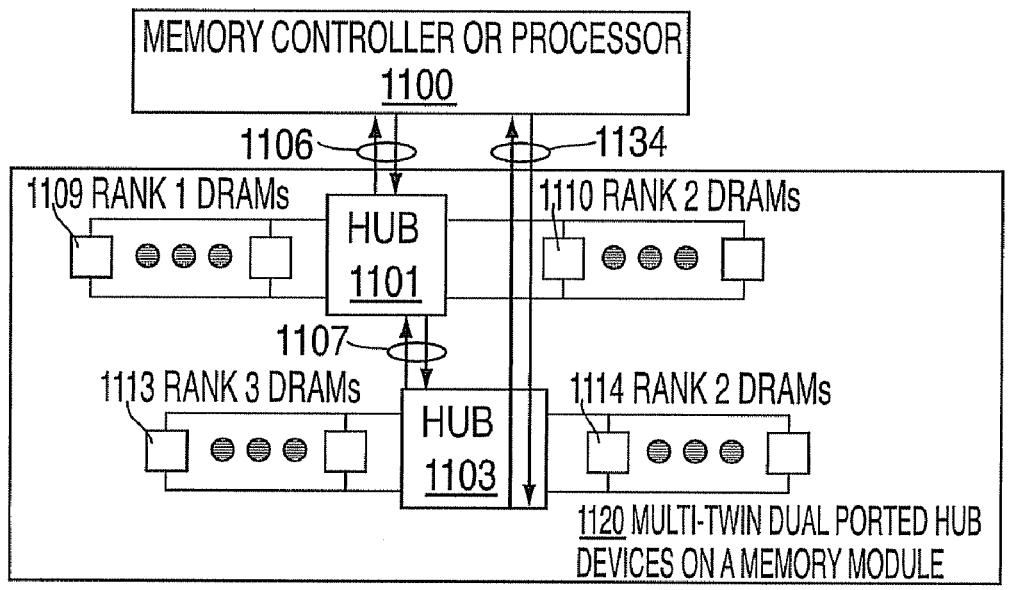
FIG. 11 is a block diagram of a memory system with a twin dual ported hub device memory module that may be implemented by exemplary embodiments.

FIG. 10 is a block diagram of a memory system with a multiple dual ported hub device memory module that may be implemented by exemplary embodiments. To the memory controller 1000 (which may be integrated into a processor), the configuration depicted in FIG. 10 appears to be a single channel (including memory busses 1006, 1007, and 1034) with two hub devices 1001 and 1003. FIG. 11 is a block diagram of a memory system with a twin dual ported hub device memory module 1120 that may be implemented by exemplary embodiments. To the memory controller 1100 (which may be integrated into a processor) the configuration depicted in FIG. 11 appears to be two channels (one including a first memory bus 1106 and the other including a second memory bus 1134) with each connecting to a single hub device 1101 and 1103, respectively. Both FIG. 10 and FIG. 11 can be implemented by the same hardware by selecting between operating modes as described previously with respect to FIGS. 8 and 9. FIG. 11 may be implemented in various modes as described above in reference to FIG. 9. One of these modes implements the configuration depicted in FIG. 10.

Cascade-able memory modules 720, 820 and 1020 can be mixed with the single hub device memory modules of FIG. 5. Memory modules with two channel (i.e., memory bus) connections to the processor, for example memory module 920 and memory module 1120 can also be interchanged depending on the desired bandwidth and memory capacity. The configurations depicted in FIGS. 7-11 can be implemented by the same physical hub device(s) programmed to operate in a particular mode. Similarly, the configurations depicted in FIGS. 7-11 can be implemented by the same physical memory module(s) programmed to operate in a particular mode.

It is desirable to have one hub device that can be utilized to produce a variety of memory cards. In some cases, the memory bus connections between the hub devices will be short (i.e., on the same memory module or card). In other cases, the connections between hub devices will be longer (i.e., when the hub devices are on different memory modules). Configurable I/O drivers and receivers, which are well known to those skilled in the art, may be utilized to adjust the driver and receiver characteristics (e.g., drive strength, interface voltage, signal pre-conditioning (e.g. pre-emphasis), interface/data capture timings, etc.) consistent with achieving optimal data integrity when operated with long or short nets. A secondary benefit of enabling the short nets is that less power will be consumed as compared to I/O drivers and receivers associated with longer nets. In exemplary embodiments, the I/O driver and receiver characteristics are set via a sensed pin on the hub device. In another exemplary embodiment, the I/O driver and receiver characteristics are set via one or more programmable mode registers in the hub device(s).

Exemplary embodiments include a computing system with a processor(s) and an I/O unit(s) (e.g., requesters) interconnected to a memory system that contains a memory controller and memory devices. The computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

Figure 1:
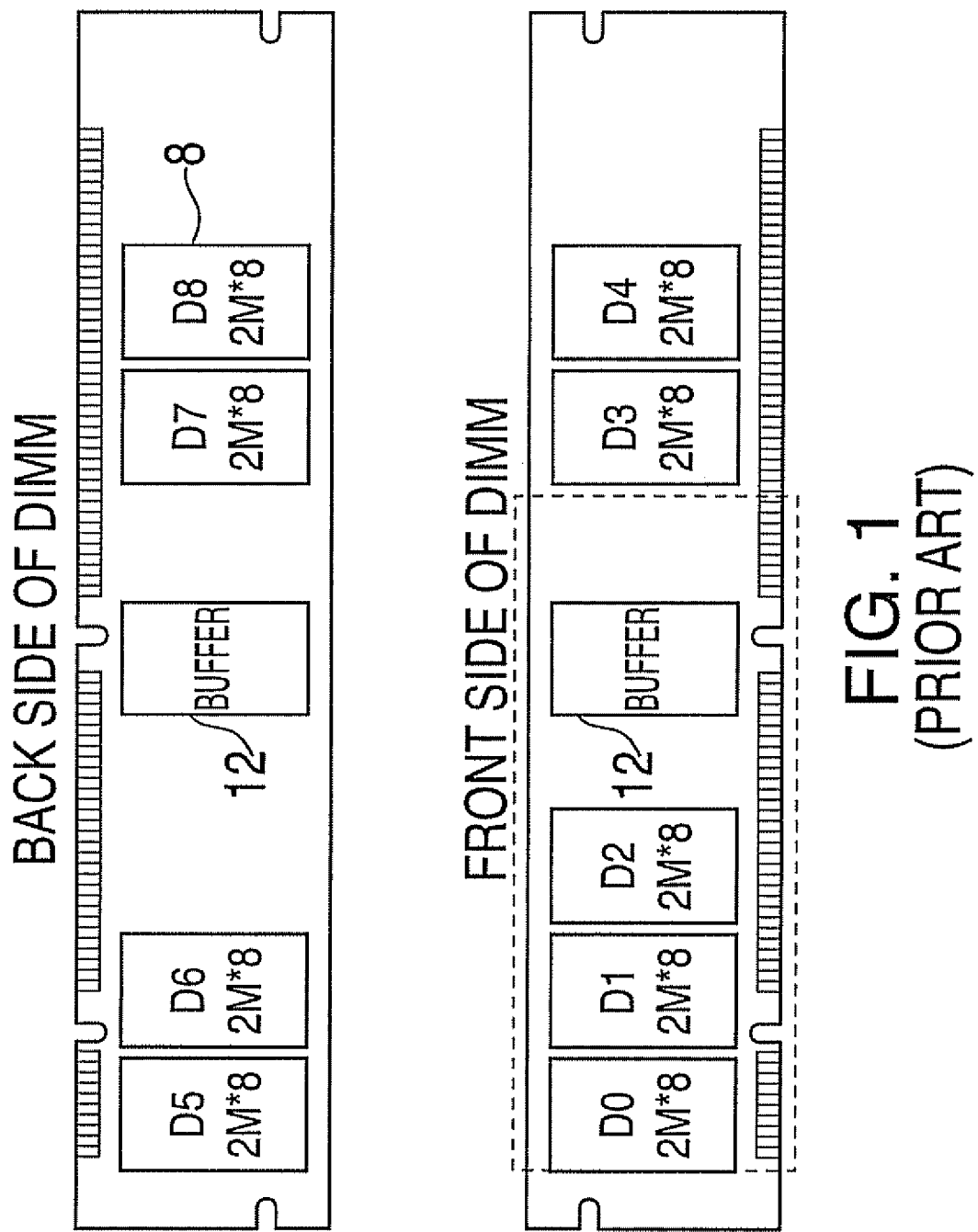
FIG. 1 depicts an exemplary early synchronous memory module.
Figure 2:
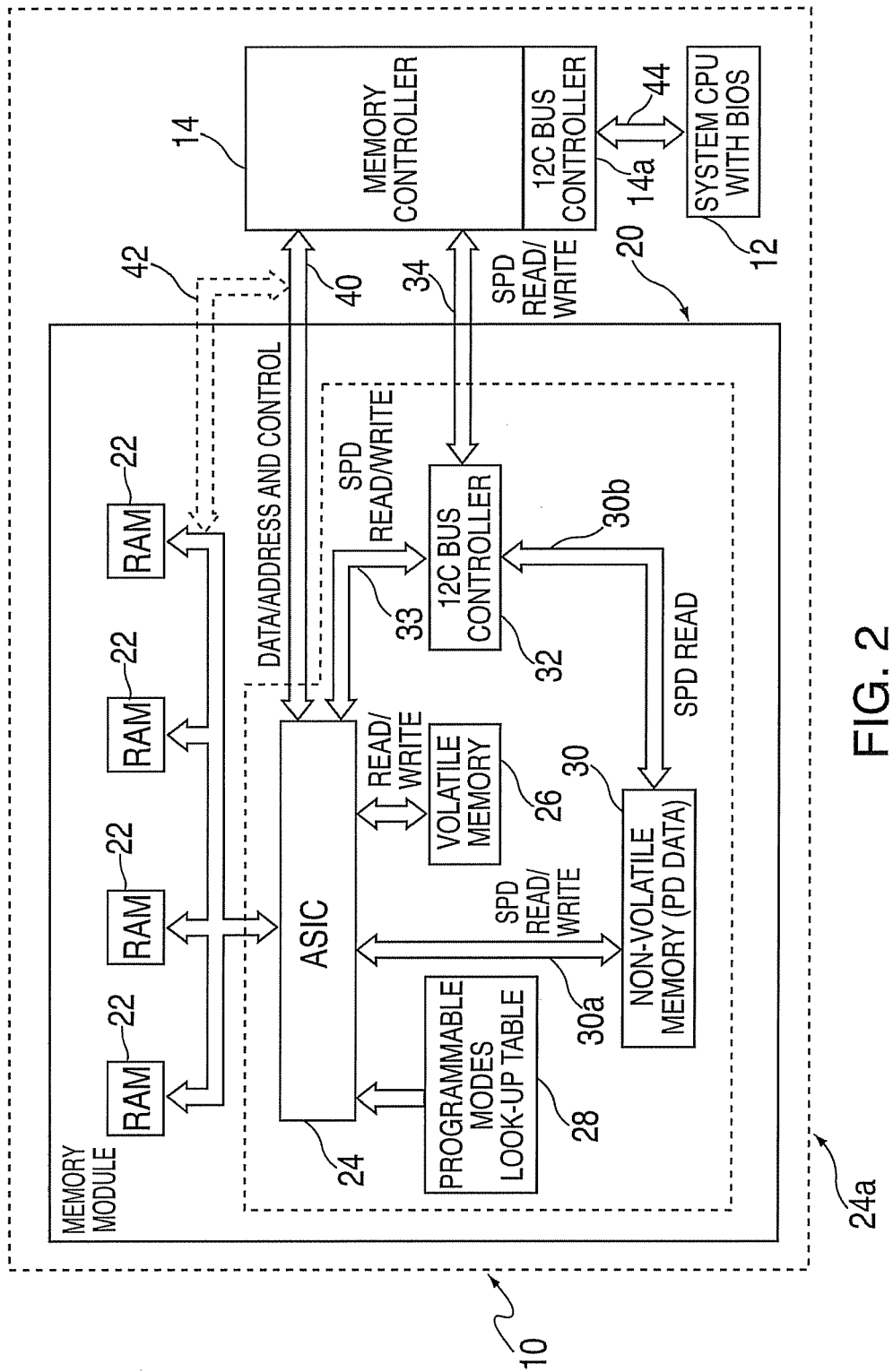
FIG. 2 depicts an exemplary computer system with a fully buffered synchronous memory module that is directly connected to a memory controller.
Figure 3:
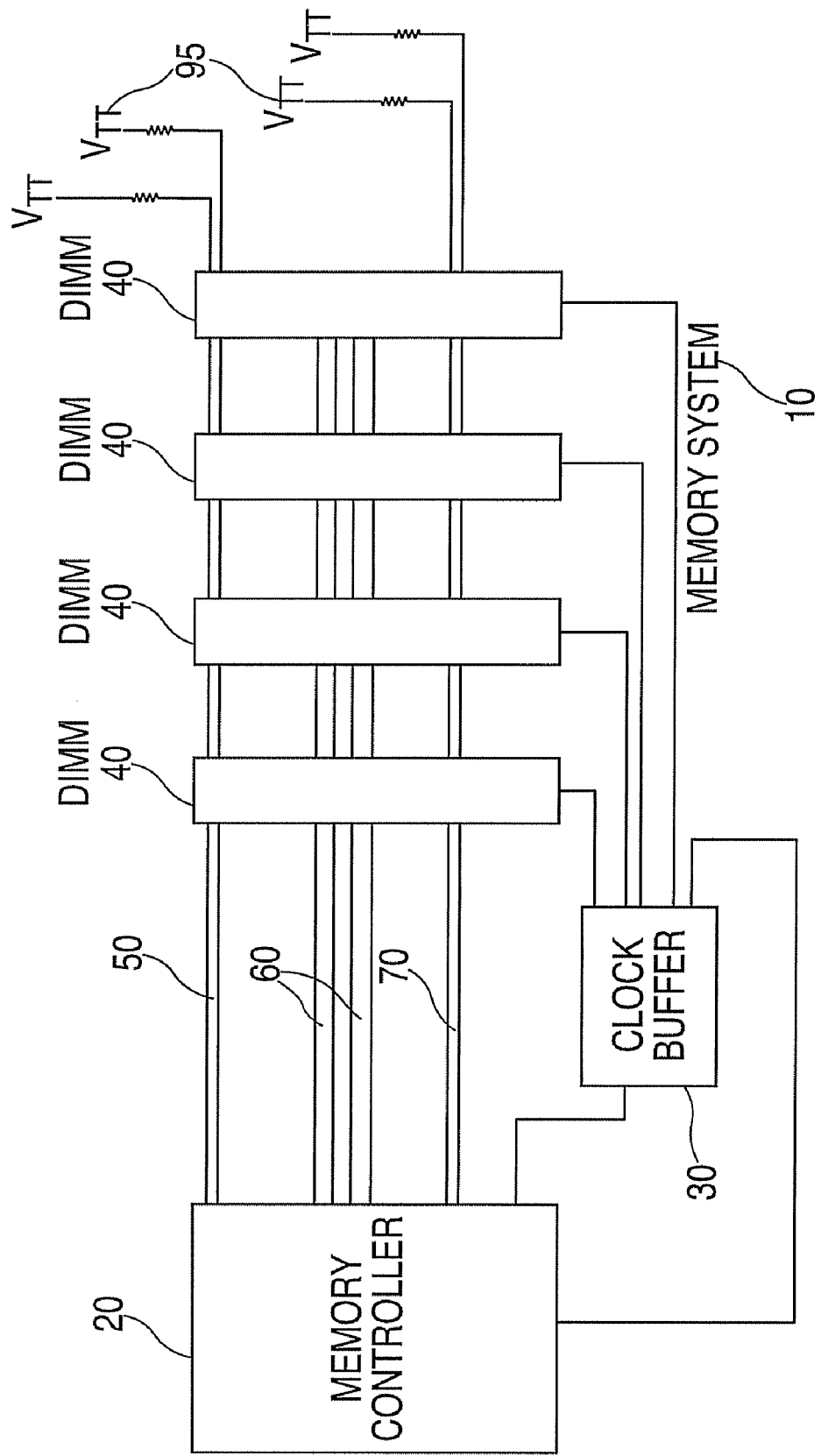
FIG. 3 depicts an exemplary memory system, shown with a single, traditional multi-drop stub bus.
Figure 4:
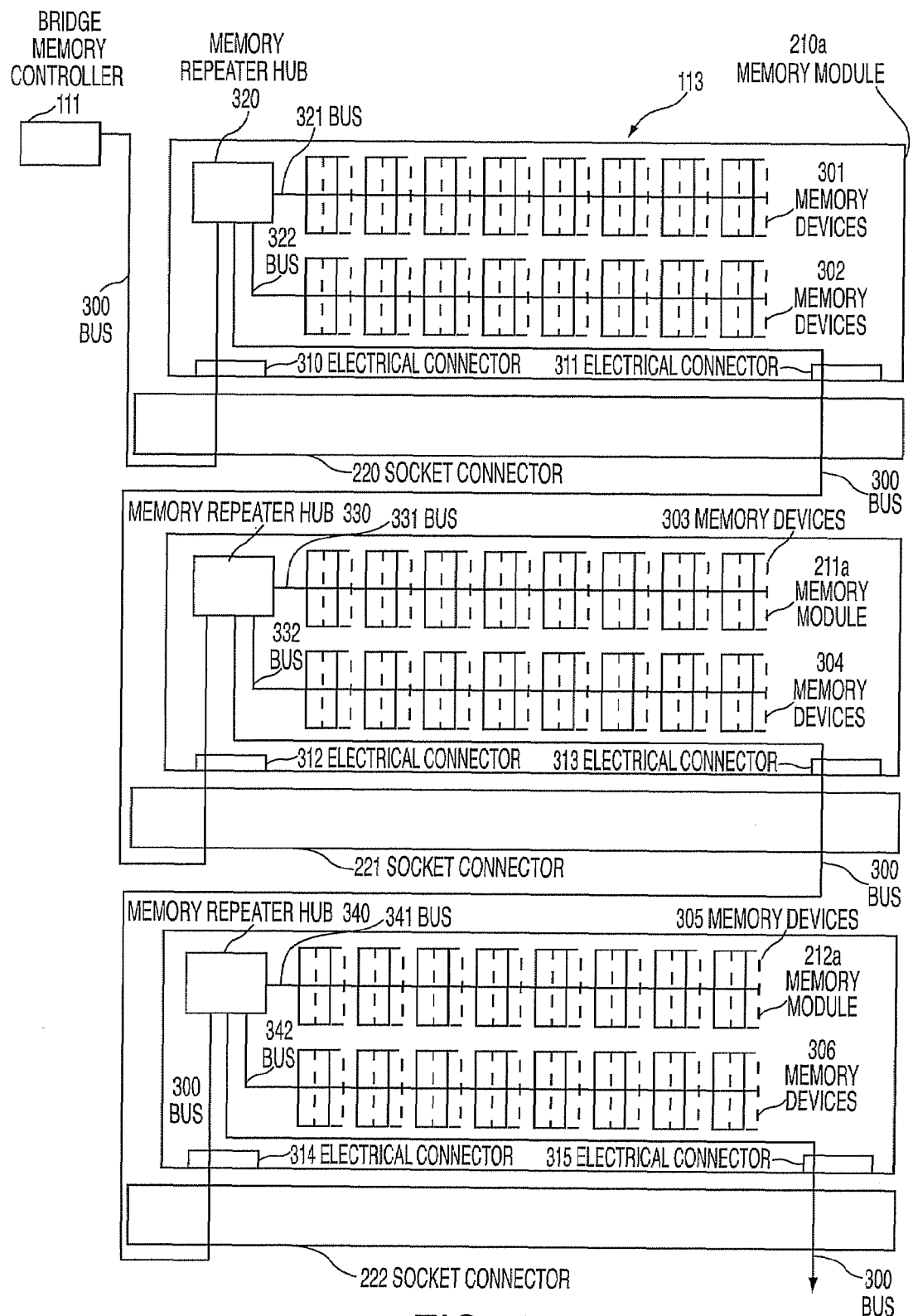
FIG. 4 depicts a fully buffered synchronous memory module and system structure, where the fully buffered synchronous memory module includes a repeater function.

The memory modules may be implemented by a variety of technologies including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules will include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller (s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization (such as described in U.S. Pat. No. 6,381,685 to Dell et al., of common assignment herewith), including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits of exemplary embodiments include the ability to have higher bus utilization, higher bus bandwidth, lower memory access latency and lower memory hub device power on a memory system having one or more memory modules (e.g., memory DIMMs), all with a memory module interface footprint (e.g., pincount) not exceeding that of a conventional memory module.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for selecting a memory module operating mode, the method comprising:

receiving an operating mode selection at a memory module, the memory module including a first hub device in communication with: a memory controller via a first port of the first hub device, a first set of memory devices via a second port of the first hub device and a second hub device via a third port of the first hub device, wherein the first hub device is operable simultaneously with and independently of the second hub device;

automatically cascade connecting the third port of the first hub device and a first port of the second hub device in response to the operating mode selection indicating a cascade interconnect mode; and automatically connecting a second port of the second hub device to the memory controller in response to the operating mode selection indicating a dual ported module mode, wherein a third port of the second hub device is in communication with a second set of memory devices, thereby allowing the memory module to be configured to operate as a single memory module and as two distinct memory modules.

2. The method of claim 1 wherein the first hub device and the second hub device are located in the same physical package.

3. The method of claim 1 wherein the first hub device and the second hub device share common circuitry.

4. The method of claim 1 wherein the first hub device includes a fourth port in communication with a third hub device.

5. The method of claim 1 wherein the first hub device includes programmable input/output (I/O) drivers and receivers.

6. The method of claim 1 wherein the second hub device includes programmable I/O drivers and receivers.

7. The method of claim 1 wherein the memory module further includes a third hub device in communication with one or more of the first hub device and the second hub device.

8. The method of claim 7 wherein the memory module further includes a fourth hub device in communication with one or more of the first hub device, the second hub device, and the third hub device.

9. The method of claim 1 wherein the first hub device is in communication with the memory controller via a high speed bus that is operated at one frequency during initialization and at a higher second frequency during normal operation.

10. A memory module comprising:
a first hub device including a first port for communicating with a memory controller, a second port in communication with a first set of memory devices, and a third port to communicate with a first port of a second hub device, wherein the first hub device is operable simultaneously with and independently of the second hub device;
the second hub device having a second port for communicating directly with the memory controller and a third port of the second hub device in communication with a second set of memory devices;
the second hub device configured in a cascade interconnect mode to communicate with the memory controller via the first hub device in response to an operating mode selection; and
the second port of the second hub device automatically connecting to the memory controller in response to the operating mode selection indicating a dual ported module mode, thereby allowing the memory module to be configured to operate as a single memory module and as two distinct memory modules.

11. The memory module of claim 10 wherein the first hub device and the second hub device are located in the same physical package.

12. The memory module of claim 10 wherein the first hub device and the second hub device share common circuitry.

13. The memory module of claim 10 further comprising a third hub device in communication with one or more of the first hub device and the second hub device.

14. The memory module of claim 13 further comprising a fourth hub device in communication with one or more of the first hub device, the second hub device, and the third hub device.

15. The system of claim 10 wherein the first hub device is in communication with the memory controller via a high speed bus that is operated at one frequency during initialization and at a higher second frequency during normal operation.

16. A memory system comprising:
two or more memory busses including a first memory bus and a second memory bus, the first memory bus operable simultaneously with and independently of the second memory bus;
a memory controller in communication with the memory busses for generating, receiving and responding to memory access requests; and
a memory module including a first hub device including three or more ports and a second hub device including three or more ports, the first hub device operable simultaneously with and independently of the second hub device;
wherein a first port on the first hub device is in communication with the memory controller via the first memory bus, a second port on the first hub device is configurable to communicate with a first port on the second hub device responsive to an operating mode selection indicating a cascade interconnect mode, and a third port on the first hub device is in communication with a first set of memory devices; and further wherein a second port on the second hub device is configurable to communicate with the memory controller via the second memory bus responsive to the operating mode selection indicating a dual ported module mode, and a third port on the second hub device is in communication with a second set of memory devices, thereby allowing the memory module to operate as a single memory module and as two distinct memory modules.

17. The memory system of claim 16 wherein the first hub device and the second hub device are located in the same physical package.

18. The memory system of claim 16 wherein the first hub device and the second hub device share common circuitry.

19. The memory system of claim 16 wherein the memory module further includes a third hub device in communication with one or more of the first hub device and the second hub device.

20. The memory system of claim 19 wherein the memory module further includes a fourth hub device in communication with one or more of the first hub device, the second hub device, and the third hub device.

* * * * *